United States Patent [19]

Layre et al.

[11] Patent Number: 4,709,625
[45] Date of Patent: Dec. 1, 1987

[54] DISPENSING MACHINE FOR TEA

[75] Inventors: John Layre, Warminster; Yong S. Park, Lansdale; George K. Schollhamer, Furlong, all of Pa.

[73] Assignee: Gross-Given Manufacturing Co., St. Paul, Minn.

[21] Appl. No.: 921,975

[22] Filed: Oct. 22, 1986

[51] Int. Cl.⁴ ............................................ A47J 31/00
[52] U.S. Cl. ................................................. 99/289 R
[58] Field of Search .................. 99/289 R, 279, 287, 99/289 T, 289 P, 299; 426/433

[56] References Cited

U.S. PATENT DOCUMENTS

| | | |
|---|---|---|
| 3,213,777 | 5/1963 | Heier . |
| 3,292,526 | 10/1966 | Heier . |
| 3,349,690 | 10/1967 | Heier . |
| 3,496,861 | 2/1970 | Stahler . |
| 3,573,860 | 4/1971 | Bentzman .................. 99/289 R |
| 3,660,117 | 5/1972 | Neely . |
| 3,948,157 | 5/1976 | Layre . |
| 4,271,752 | 6/1981 | Valente ....................... 99/289 R |
| 4,271,753 | 6/1981 | Neely . |
| 4,648,313 | 3/1987 | Kokubun ..................... 99/289 R |

Primary Examiner—Robert W. Jenkins

Attorney, Agent, or Firm—Panitch Schwarze Jacobs and Nadel

[57] ABSTRACT

The present invention relates to an apparatus for non-pressurized infusion brewing of a beverage, and especially tea brewed freshly from tea leaves, primarily adapted for use in vending machines. The apparatus includes a novel brew assembly comprising a frame, a carriage reciprocable along the frame between a brew position and discharge position. The carriage is driven between the brew position and discharge position by a motor driven crank pin mounted on a crank arm in which the crank pin is slidable in a transverse slot formed in the carriage. The carriage carries a brew cavity having an open top and bottom with externally extending guide pins mounted on opposed side walls. The brew cavity is mounted within the carriage and is normally biased towards a lower position. The brew cavity includes a stop member which abruptly abuts the carriage after the guide pins of the brew cavity are raised by inclined cam members to a maximum point where the guide members ride off the end of the cam members to cause the discharge of spent tea leaves or other solid infusible material by virtue of inertia and gravity. The brew cavity guide members then pass under the inclined cam members back to the brew position where the cycle begins again.

18 Claims, 9 Drawing Figures

DISPENSING MACHINE FOR TEA

BACKGROUND OF THE INVENTION

1. Field of the Invention

The present invention relates to a dispensing machine for an infusion brewed beverage. More particularly, the present invention relates to apparatus for nonpressurized infusion brewing of a beverage, and specifically preferably tea, freshly brewed in each cycle of the operation of the apparatus from tea leaves. The present apparatus has primary use in a beverage vending machine. By using the present invention, it is possible to freshly brew and dispense individual cups of tea from a vending machine.

2. Description of the Prior Art

Beverage brewing devices for preparing single cup quantities of liquid beverages by the extraction technique are known. See, for example, U.S. Pat. Nos. 3,213,777; 3,292,526; 3,349,690; 3,496,861; 3,660,117; and 4,271,573. While the foregoing patents disclose beverage brewing apparatus which was the state of the art at the time of their invention, and performed in a satisfactory manner, they were primarily for the purpose of brewing coffee primarily in vending machines. The brewing mechanisms of these patents employed a means for pressurizing the hot water used to brew the beverage by which hot water was forced through either a preformed filter package including the ground coffee beans or through ground coffee beans directly deposited on a filter assembly in an appropriate brew cavity component. Prior brew assemblies or mechanisms employed an extensive series of cams, sometimes with auxiliary gear segments operating cables, as in U.S. Pat. No. 4,271,753 to enable the complete cycling of the assembly to make a cup of brewed beverage. The use of relatively complicated brew mechanisms which were relatively difficult and expensive to manufacture, assemble and maintain compared to the present invention lead to the development of the present invention.

The present invention is believed to significantly simplify the structure and operation of a beverage brewing mechanism and is particularly adapted for dispensing single cups of freshly brewed tea from tea leaves by using a brew assembly in which it is unnecessary to pressurize the water as it passes through the tea leaves to make the liquid tea beverage. The use of a pressurized mechanism is not desirable in the present invention, as tea is extracted to yield a better tasting freshly brewed tea when the hot water is allowed to flow naturally through the tea leaves by gravity. The present invention operates in a relatively simple, efficient and economical manner cycling from a brew position through a spent tea leaf discharge position and back to the brew position, scraping or wiping the tea leaves off of a filter held in a filter assembly between the brew position and the discharge position.

SUMMARY OF THE INVENTION

The present invention is directed to an apparatus for nonpressurized infusion brewing of a beverage including a brew assembly, the brew assembly comprising a frame;

a carriage reciprocable along the frame in a first direction between a brew position and a discharge position, the carriage including a slot formed therein generally transverse to the first direction;

a motor driving a rotating shaft;

a crank arm having two ends and being attached to the shaft proximate one end;

a crank pin attached to the crank arm proximate the other end of the crank arm and extending into the slot in the carriage;

the motor being actuatable to cause the carriage to reciprocate between the brew and discharge positions by rotating the shaft whereby the crank pin reciprocates within the slot;

a brew cavity mounted to the carriage and having side walls and an open top and bottom, the brew cavity having at least one guide pin mounted on a side wall;

a filter assembly mounted on the frame and aligned with the brew cavity at the brew position and including a filter for supporting solid infusible material;

brew cavity mounting means for mounting the brew cavity to the carriage such that the brew cavity is moveable vertically with respect to the carriage between upper and lower positions;

biasing means extending between the brew cavity and the carriage normally exerting a biasing force to bias the brew cavity toward the lower position to such an extent that when the brew cavity is in the brew position, the bottom of the brew cavity is held in sealing engagement with the filter assembly surrounding the filter;

cam means having a camming surface mounted on the frame between the brew and discharge positions for engagement with the brew cavity guide pin to overcome the biasing force and for raising the brew cavity from the lower position toward the upper position as the guide pin travels along the camming surface from the brew position toward the discharge position; and stop means associated with the brew cavity to prevent the brew cavity from extending below the lower position after the brew cavity guide pin travels past the cam means to the discharge position at which the brew cavity is abruptly biased to the lower position, whereby the infusible material from which the beverage has been brewed is dishcarged from the brew cavity.

As set forth above, the preferred beverage brewed is tea. It is also preferred that the apparatus of the present invention be used in a vending machine, although the apparatus can also be used in noncommercial settings, such as in offices, homes, and the like. Improved efficiency of operation and the elimination of several of the prior art components previously thought necessary in brewing apparatus used primarily in vending machines resulted in the apparatus of the present invention which simply, consistently and economically produces high quality brewed beverages, and particularly freshly brewed tea from tea leaves.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT

Figure 1:
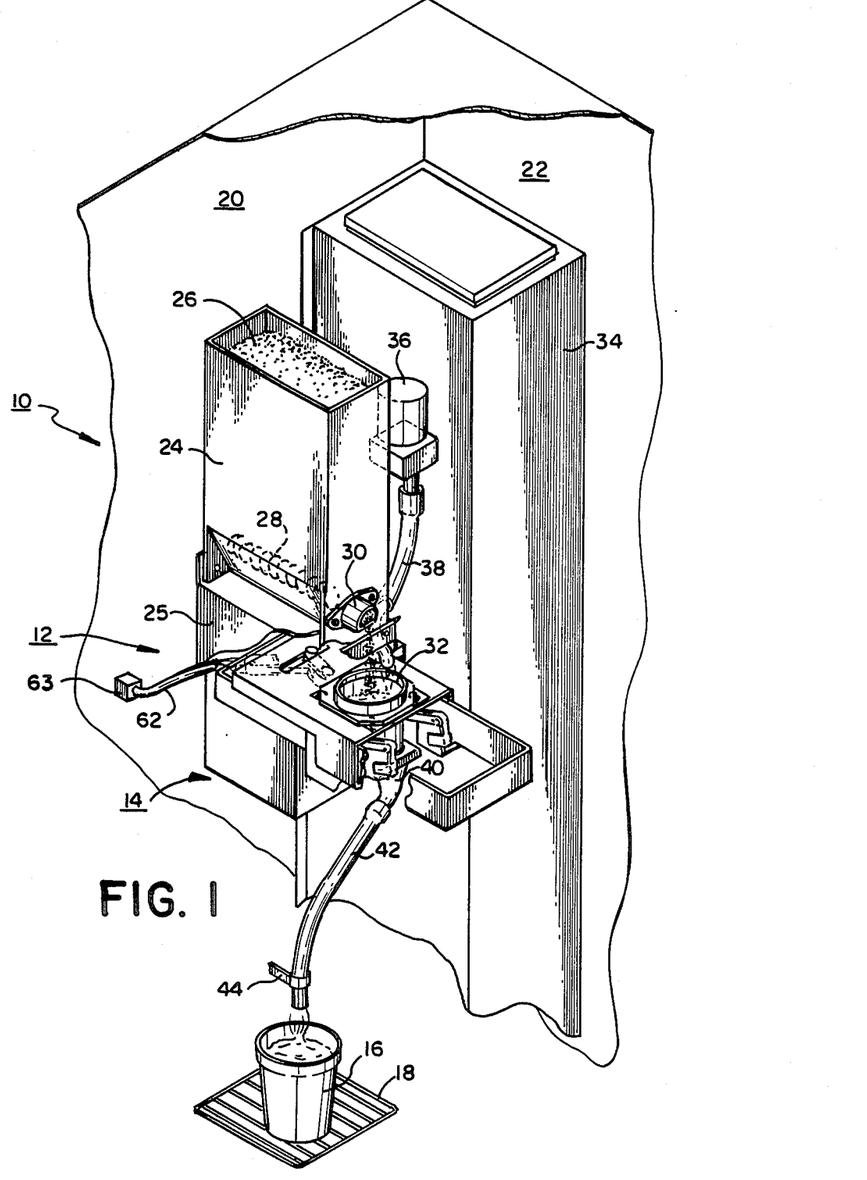
FIG. 1 is a perspective view, partially broken away, of a portion of a vending machine incorporating the apparatus of the present invention.

Referring to the drawings in detail, wherein like numerals indicate like elements throughout the several views, there is shown in FIG. 1 a portion of a vending machine 10 including a beverage brewing mechanism 12 which includes a brew assembly apparatus 14 according to the present invention. Vending machine 10 may be any type of conventional vending machine in which one or more hot or cold beverages are dispensed individually into a cup 16 held on a cup support 18 mounted in a suitable manner within the vending machine. A brewing cycle is initiated by the insertion of a coin or currency in a manner well known to those skilled in the vending machine art. Although only one brew mechanism 12 is illustrated in vending machine 10, it will be readily understood by those skilled in the art that other brew mechanisms of the same or different construction can be included within the same vending machine.

Further, although the brew assembly 14 of the present invention is primarily intended to be used in a commercial vending machine, the brew assembly could be used in brew mechanisms associated with smaller home or office beverage dispensers, if desired.

Vending machine 10 includes a cabinet having a rear wall 20 and a side wall 22 attached to the rear wall. Of course, vending machine 10 also includes the usual coin slots, dispensers for condiments, such as creamer, sugar or other sweetener, lemon or lemon flavoring, and the like, as well as the usual coin or currency slots and mechanical, electromechanical or electronic selection and control mechanisms which do not per se form a part of the present invention.

Brew mechanism 12 includes a hopper or canister 24 containing tea leaves or other infusible solid material 26. Canister 24 may be attached directly to rear wall 20 or may be attached to a base member 25 which in turn is attached to rear wall 20. An auger or other dispensing aid causes the tea or other material 26 to be dispensed through outlet 30 of the canister and into a brew cavity 32 to be described in more detail hereinafter. Condiments, such as sugar, cream, lemon or the like could also be added to brew cavity 32 from separate canisters within the vending machine sequentially or simultaneously along with the tea 26.

A source of hot water, such as a hot water tank 34 which may be connected to an external source of water, is attached to rear wall 20 and side wall 22 within vending machine 10. At the appropriate time as determined by state of the art electronic and/or electromechanical controls, a solenoid valve 36 dispenses enough hot water through conduit 38 into brew cavity 32 where it extracts the tea or other flavor from tea leaves or other infusible material and any condiments in the brew cavity. The brewed tea or other beverage then travels through a funnel shaped collector 40 through conduit 42 supported by conduit support 44 and into cup 16. Following the brew cycle just described above, the brew assembly apparatus of the present invention provides for the discharge of previously used or spent tea leaves from a filter assembly and brew cup 32 in a manner to be described hereinafter.

The brew assembly apparatus 14 according to the present invention will now be described in greater detail, initially with respect to FIGS. 2, 3 and 4.

The brew assembly apparatus 14 includes a frame 46 including a front wall 48 and opposed side walls 50, 52 attached thereto. Frame 46 is mounted within the vending machine in operative cooperation with the other components of brew mechanism 12 in any suitable manner, such as by being mounted to supports within the vending machine. Side wall 50 has a top edge 54 and side wall 52 has a top edge 56. A motor 58, preferably a conventional A.C. electric motor, is attached within a motor housing 60 attached to frame 46 in any suitable manner. Electric current is supplied through wires 62 connected to a current source by a plug 63 in a usual manner through a switch 64 and ultimately to motor 58 when the switch is closed. The switch is a normally closed switch which is opened when a switch arm 66 is moved laterally to the position illustrated in FIGS. 2 and 4 by a switch activator attached to a crank arm driven by motor 58 in a manner to be described hereinafter. Where the motor is mounted proximate the brew cup 32, it is preferred that motor housing 60 be sealed to prevent water or other liquids from coming into contact with the motor.

If desired, rather than mounting motor 54 in a motor housing 60 to frame 46, the motor may be mounted remotely within the vending machine with the components of the invention driven by the motor indirectly by means of belts, chains, gears or other driving connectors. Further, the motor may be any other type of driving means besides an electric motor, such as a hydraulic motor, a pneumatic piston or other driving device which can be activated electrically for driving means for reciprocating a carriage as described hereinafter.

Extending over and sliding on top of frame 46 is a carriage 70. Carriage 70 includes a top member 72 and opposed side members 74 and 76 best illustrated in FIGS. 6 and 7. With reference to those figures, it can be seen that carriage 70 is supported by frame side walls 50 and 52, and particularly by the top edges 54 and 56 of such side walls respectively.

Preferably, frame 46 is made of a noncorrosive, easy to clean metal, such as stainless steel. Preferably, carriage 70 is made of a durable synthetic polymeric plastic material approved for use with food machinery, such as polycarbonate. To reduce the friction between the bottom surface of top member 72 of carriage 70 and the top edges 54 and 56 of the frame side walls, a coating of a friction reducing polymer, such as polytetrafluoroethylene or the like, may be applied to one or both of the undersurface of top member 72 or top edges 54, 56. Alternately, rollers or other bearing members may be used to reduce the friction between the relatively moving surfaces.

Figure 6:
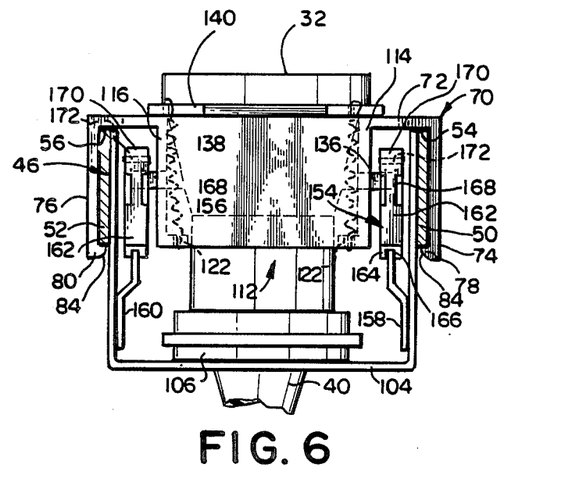
FIG. 6 is a vertical sectional view of the brew assembly apparatus taken along line 6—6 of FIG. 4.
Figure 7:
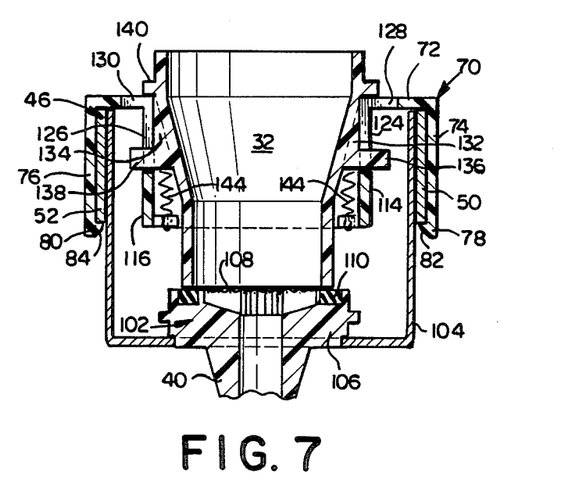
FIG. 7 is a vertical sectional view of the brew assembly apparatus taken along the line 7—7 of FIG. 4.

With further reference to FIGS. 6 and 7, side members 74 and 76 of carriage 70 include retaining means in the form of flanges 78 and 80, respectively, which extend below the bottom edges of the frame side walls 50 and 52, respectively. Thus, flanges 78 and 80 prevent carriage 70 from being lifted vertically from the frame 46. Flanges 78 and 80 preferably include an angled or rounded surface 82, 84, respectively to make it easier to snap the carriage over the frame side walls.

Figure 3:
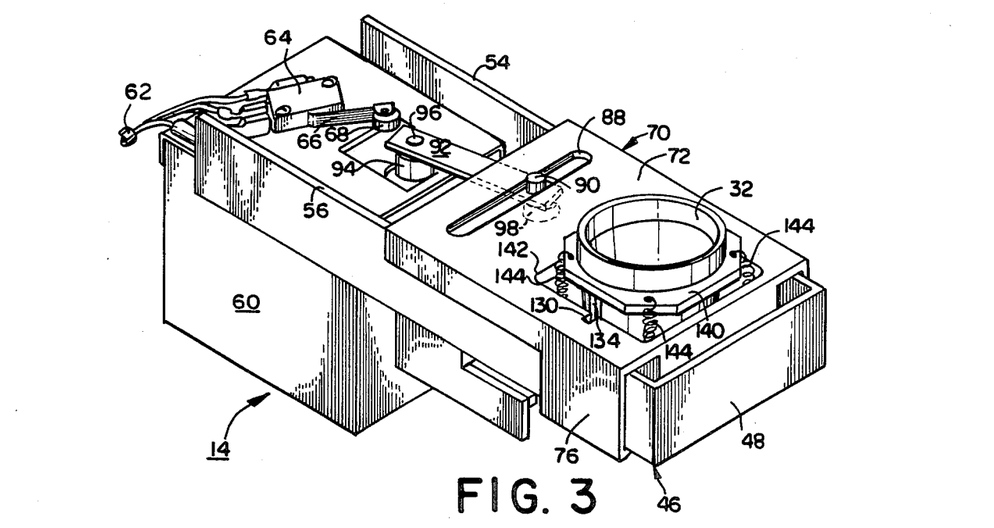
FIG. 3 is a perspective view of the brew assembly apparatus when the carriage carrying the brew cavity is extended to a position just prior to a discharge position.
Figure 4:
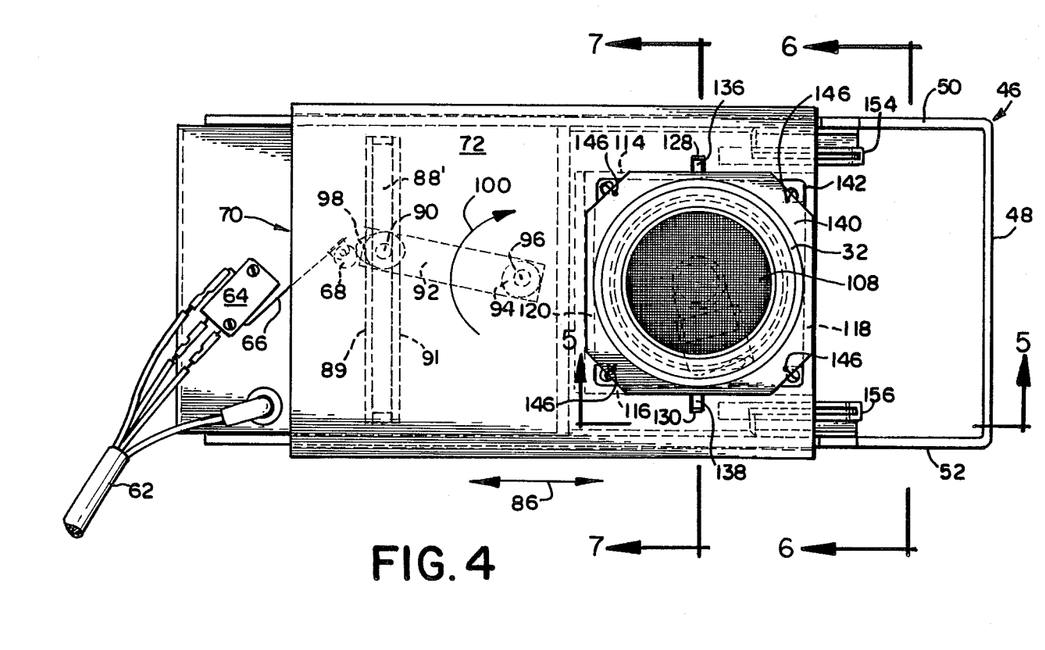
FIG. 4 is a top plan view of a slightly modified embodiment of the brew assembly apparatus in the position illustrated in FIG. 2

As best illustrated in FIG. 4, carriage 70 is reciprocable along frame 46 in a direction indicated by double headed arrow 86. As best illustrated in FIGS. 2 and 3, an elongated slot 88 is formed in top member 72 of the carriage in a direction generally transverse to the direction of arrow 86. FIG. 4 illustrates a modified embodiment in which a slot 88' is defined by ribs 89 and 91 depending from the lower surface of top member 72 of carriage 70. In this way, top member 72 has a uniform, flat top surface which is easy to clean and maintain.

Reciprocating within slot 88 or 88' is a crank pin 90 attached to a crank arm 92 which, in turn, is attached to a rotating shaft 94 by a fastener 96. As referred to herein, the term "slot formed in the carriage" or equivalent terms, means slots 88, 88' or the like associated with carriage 70 for restricting the travel of crank pin 90 to reciprocate the carriage. Shaft 94 is driven in a clockwise direction when viewed in FIG. 4 as indicated by direction arrow 100. Shaft 94 is driven in the clockwise direction either directly or indirectly by motor 58.

When shaft 94 rotates clockwise as indicated in FIG. 4, crank arm 92 also rotates clockwise. Crank pin 90 reciprocates in slot 88 or 88' formed in the carriage 70. Initially, prior to activation of the motor, switch activator 98, which may be in the form of a generally oval cam is in contact with switch arm 66. If desired, a follower 68 may be attached to switch arm 66 to contact switch activator 98. In the position illustrated in FIG. 4, switch arm 66 is disposed such that switch 64 is in an open, or off position. Upon initial energization of the system, such as when the proper amount of money is inserted into the vending machine, the motor is actuated and rotates shaft 94 slightly so that activator 98 is not in contact with follower 68 and switch arm 66 is allowed to assume its normal position in which the switch is in a closed, or on position illustrated in FIG. 3.

When switch 64 is closed, the full brew, discharge and return cycle of the brew assembly apparatus of the present invention is initiated. The carriage and brew cavity are in the brew position illustrated in FIG. 5a. As shaft 94 continues to rotate clockwise, crank pin 90 slides toward the right end of slot 88 illustrated in FIG. 3 or toward the upper end of slot 88' illustrated in FIG. 4, slightly moving the carriage toward front wall 48 of frame 46. When crank pin 90 reaches the end of its travel within slot 88 or 88', and as shaft 94 continues to rotate clockwise, carriage 70 is driven from the brew position illustrated in FIG. 5a through intermediate positions, one of which is illustrated in FIG. 5b, toward a discharge position proximate front wall 48 of frame 46 as illustrated in FIG. 5c. Just prior to reaching the discharge position, crank arm 92 would be in a position generally as illustrated in FIG. 3. At the discharge position, crank arm 92 is substantially perpendicular to slot 88 and 88'. After reaching the discharge position, and as shaft 94 continues to rotate clockwise, crank pin 90 reciprocates toward the other end of slot 88 or 88' (the left end of FIG. 3 and bottom of FIG. 4) to return carriage 70 toward the brew position. On its way back toward the initial brew position, the carriage and brew cavity 32 pass through an intermediate position illustrated in phantom in FIG. 5c. To complete the cycle, switch actuator 98 contacts switch arm 66 directly or through attached follower 68 to open switch 64 until the cycle is restarted by insertion of the proper amount of money.

Now that the overall reciprocating movement of the carriage assembly has been described, details of the structures involved in the operation of the brew, discharge and return cycle will now be described.

Figure 2:
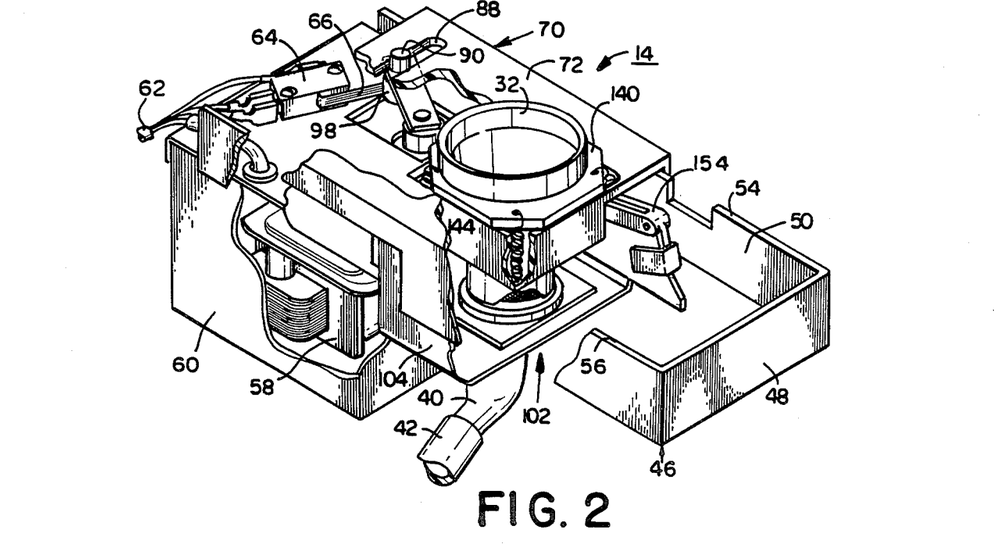
FIG. 2 is a perspective view, partially broken away, of the brew assembly apparatus of the present invention when the carriage carrying the brew cavity is in the brew position.

As best illustrated in FIGS. 2, 6 and 7, a filter assembly 102 is attached to frame 46 by a generally U-shaped support member 104. Filter assembly 102 includes a hollow filter holder 106 extending through an aperture in the bottom portion of support member 104. Filter holder 106 may be integrally formed with or separately attached to funnel shaped connector 40. A filter 108, which may be in the form of a mesh screen of stainless steel, a perforated stainless steel or polymeric disk, or the like, is supported by filter holder 106. The filter holder 106 also includes a sealing gasket 110 made of suitable elastomeric material, for example natural or synthetic rubber, such as a silicone rubber. Filter 108 is dimensioned to fit within the bottom portion of brew cavity 32 as best seen in FIG. 4. In the brew position, illustrated in FIGS. 2, 4, 5a and 7, the lower edge of the brew cavity is held into sealing engagement with seal 110. This relationship is best illustrated in FIG. 7.

Brew cavity 32 is sized to contain enough liquid to fully extract the flavor components of the tea or other solid infusible material and any condiments supported by the filter, such that the beverage will not overflow cup 16. Brew cavity 32 is generally cylindrical with an open top and bottom, although it may have converging internal side wall portions as best illustrated in FIGS. 5a, 5b and 5c, and FIGS. 6 and 7.

The brew cavity is mounted to carriage 70 by a brew cavity mounting assembly 112 which will now be described with particular reference to FIGS. 2, 4, 5a, 6 and 7. Brew cavity mounting assembly 112 includes opposed side walls 114 and 116 spaced inwardly from side walls 50 and 52 of frame 46. If desired, brew cavity mounting assembly 112 may also include front and rear walls 118, 120 (see FIG. 4). Depending walls 114, 116, 118 and 120 may be formed integrally with or separately attached to top member 72 of carriage 70. An inwardly extending flange 122 may be formed on the bottom of opposed side walls 114, 116, front and rear walls 118, 120 or all four of such walls. Elongated vertical slots 124 and 126 are formed in the respective side walls 114 and 116 for purposes to be made clear hereinafter. Slots 124 and 126 are aligned with horizontal slots 128 and 130, respectively, formed in top member 72 of carriage 70.

Brew cavity 32 includes generally vertical flanges 132 and 134 extending outwardly from opposed side walls of the brew cavity which may extend into vertical slots 124 and 126 and horizontal slots 128 and 130, respectively. Extending further outwardly from flanges 132 and 134 are guide pins 136 and 138, respectively. The guide pins extend significantly through vertical slots 124 and 126 and into but not beyond horizontal slots 128 and 130. If desired, guide pins 136 and 138 could extend outwardly directly from the side walls of brew cavity 32, and flanges 132 and 134 could be eliminated. However, preferably, both the vertical flanges and the guide pins extend outwardly from opposed sides of the brew cavity to provide a more positive alignment of the brew cavity within the slots of the brew cavity mounting assembly. It is also preferred that flanges 132, 134 and guide pins 136, 138 are integrally formed together with the brew cavity as a unitary structure made of a molded synthetic polymer, all as best illustrated in FIG. 7.

A stop member 140 is attached to and preferably integrally formed with brew cavity 32 proximate the top of the brew cavity. Stop member 140 is best illustrated in FIGS. 2, 3 and 4. As seen in those Figures, it is clear that stop member 140 is formed as a flange, and as illustrated, a polygonal flange extending outwardly at approximately right angles to the upper portion of the side walls of brew cavity 32. Stop member 140 has at least one side, and as illustrated, four sides which extend beyond the perimeter of an opening 142 formed in top member 72 of carriage 70. Thus, the bottom surface of stop member 140 is supported by the upper surface of top member 72 of carriage 70. Although stop member 140 is illustrated as being generally octagonal in shape for purposes to be described hereinafter, stop member 140 can be of any desired shape so long as at least one portion extends beyond a portion of the perimeter of opening 142 to support the brew cavity within the opening.

Brew cavity 32 is normally urged downwardly by biasing means, such as a plurality of extension springs 144 which resiliently connect brew cavity 32 to carriage 70. The points of connection are best illustrated in FIGS. 4, 5a, 5b, 5c, 6 and 7. One end of each spring preferably passes through a hole 146 formed in each of the four cut away corners of stop member 140 and is hooked over or otherwise secured to stop member 140. The other end of each spring preferably is inserted through holes 148 formed in flanges 122 formed at the lower end of walls 114, 116, 118 and/or 120 and is hooked over or otherwise secured to flange 122.

Figure 5A:
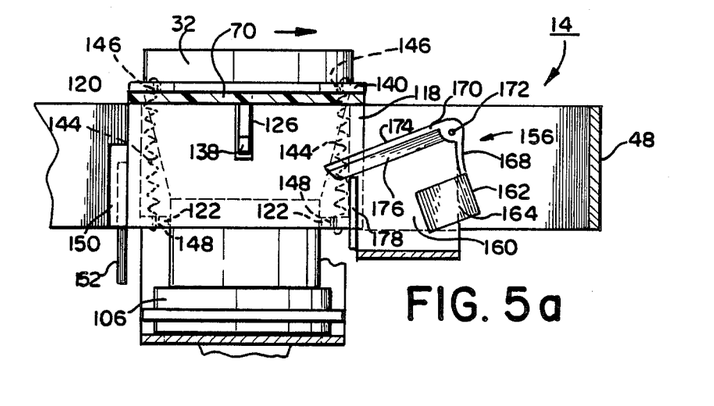
FIG. 5a is a vertical sectional view taken along line 5—5 of FIG. 4 of the brew assembly apparatus, partially broken away, showing the carriage in the brew position.
Figure 5B:
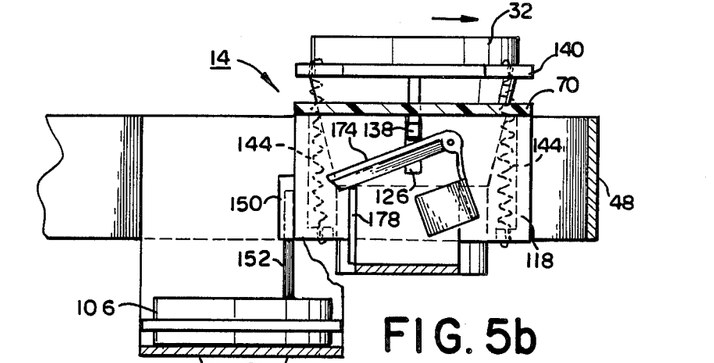
FIG. 5b is a vertical sectional view similar to FIG. 5a showing the carriage in an intermediate position between the brew position and a discharge position.
Figure 5C:
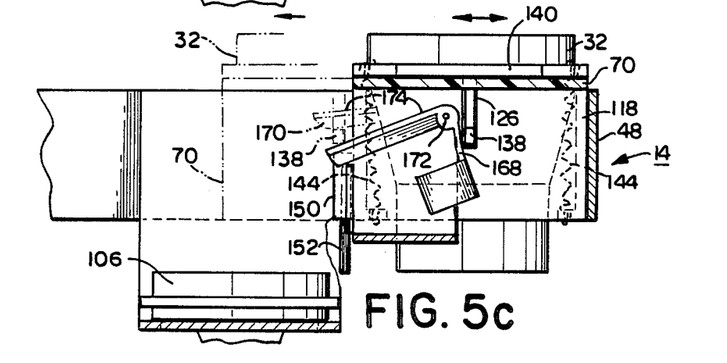
FIG. 5c is a vertical sectional view similar to FIGS. 5a and 5b, showing in solid lines the carriage at the discharge position, and in phantom lines the carriage in an intermediate return position between the discharge position and the brew position.

When the carriage assembly and brew cup are in the brew position of FIG. 5a, and as best illustrated in FIG. 7, springs 144 bias brew cavity 32 into intimate sealing contact with seal 110 mounted within filter holder 106. A sufficient biasing force is exerted so that liquid does not flow between the bottom of brew cavity 32 and seal 110. Rather, all of the liquid would flow through tea or other solid infusible material retained on filter 108, then through funnel shaped collector 40 and into conduit 42 to be dispensed into cup 16.

Attached to rear wall 120 of brew cavity mounting assembly 112 is a wiper support 150 which supports a wiper 152. The operation of the wiper will be explained in more detail hereinafter with respect to the movement of the carriage during the brew, discharge and return cycle generally illustrated in FIGS. 5a, 5b and 5c.

With reference to FIGS. 5a, 5b, 5c and 6, there is shown a cam means in the form of pawl members 154 and 156 mounted by mounting members 158 and 160, respectively, attached to opposed sides of U-shaped support member 104, which in turn is attached to frame side walls 50 and 52. Pawl members 154 and 156 are aligned with each other and are mounted in a like manner on their respective mounting members 158 and 160. Accordingly, only pawl member 156 will be described in detail with reference to FIGS. 5a and 6, since pawl member 154 is identical to pawl member 156.

Pawl member 156 includes a lower portion 162 which has two opposed legs 164 and 166 straddling mounting member 158. Integrally formed with lower portion 162 is a narrowed middle portion 168 and an upper portion 170. A pin 172 fastens pawl member 154 to mounting member 158. Upper portion 170 is angled as indicated in FIG. 5a and includes an upper camming surface 174 with a depending reinforcement portion 176. The bottom surface of reinforcement portion 176 is supported by but is not secured to an abutment 178 attached to mounting members 158 and 160.

Upper portions 170 of pawl members 154 and 156 are resiliently pivotable about pin 172 for the purpose described hereinafter. The pawl members preferably are made of an acetal resin such as Delrin or other suitably strong and resilient synthetic polymeric resin.

The operation of brew assembly 14 and the operational interrelationship of the carriage, brew cavity and wiper with the other components of brew assembly 14 and brew mechanism 12 will now be described primarily with reference to FIGS. 5a, 5b and 5c throughout one complete brew, discharge and return cycle.

FIG. 5a illustrates the position of carriage 70 and brew cavity 32 in a brew position also seen in plan view in FIG. 4. Stop member 140 is biased downwardly by springs 144 and is supported by top member 72 of carriage 70, such that brew cavity 32 is in its lower position. In this position, the bottom edge of brew cavity 32 is in sealing engagement with seal 110 held by filter holder 106 of filter assembly 102, best illustrated in FIG. 7.

In the brew position, tea or other solid infusible material 26 is dispensed from container 24, together with condiments as desired, are dispensed into brew cavity 32 and upon filter 108 a described above with respect to FIG. 1. Shortly thereafter, a cup of hot water is metered by solenoid valve 36 through conduit 38 into brew cavity 32.

Preferably, the discharge end of conduit 38 has a plurality of openings or a nozzle to evenly distribute hot water over the tea. This even distribution provides for a quicker and more complete extraction of the flavor components. The hot water drips through the tea leaves by gravity, thereby freshly brewing a cup of tea which is received in cup 16. The operational sequences are controlled by standard vending equipment control means, such as electronic and/or electromechanical timers, relays, switches and the like, the details of which are well known to those skilled in the art and need not be recited herein. The arrow in FIG. 5a indicates the direction of travel of carriage 70 and associated brew cavity 32 shortly after the brew portion of the complete cycle is completed.

FIG. 5b illustrates carriage 70 in an intermediate position between the brew position of FIG. 5a and a discharge position illustrated in FIG. 5c. The arrow at the upper portion of FIG. 5b signifies the direction of travel of carriage 70 from the brew position toward the discharge position. Although stop member 140 is flush against the upper surface of carriage 70 in FIG. 5a, as the carriage travels towards the right, guide pins 136 and 138 (only guide pin 138 being visible in FIGS. 5a, 5b and 5c) contacts upper camming surfaces 174 of upper portions 170 of pawl members 154 and 156. As the carriage travels toward the right between the brew position illustrated in FIG. 5a and the discharge position illustrated in 5c, guide pins 136 and 138 and, therefore, entire brew cavity 32 are cammed upwardly to an upper position by camming surfaces 174. Springs 144 are extended as stop member 140 is raised.

As the carriage moves between the brew position in FIG. 5a until the guide pins 136 and 138 are raised by camming surfaces 174, the bottom edge of brew cavity 32 acts to scrape spent tea leaves or other spent solid infusible material off of filter 108. The scraping or wiping action is completed by wiper 152 which contacts filter 108 as generally indicated in FIGS. 5b and 5c. The spent tea leaves are scraped and wiped into a suitable and conveniently placed refuse container (not illustrated).

Just after guide pins 136 and 138 are raised to a maximum position on the camming surfaces 174 above pawl mounting pin 172, guide pins 136 and 138 ride off the end of upper camming surfaces 174 of the pawl members. Extension springs 144 cause brew cavity 32 to snap or jolt downwardly almost immediately, such that guide pins 136 and 138 are returned from an upper position in slot 126 as illustrated in FIG. 5b back to the lower position of the guide pins 136 and 138 in slot 126 as illustrated in FIGS. 5a and 5c. The bottom surface of stop member 140 abruptly comes into contact with the top surface of carriage 70 such that any spent tea leaves or any solid infusible material remaining on the side walls or bottom edge of brew cup 32 are released from and projected downardly from the brew cavity. This is the discharge position illustrated by solid lines in FIG. 5c. It can also be seen in FIG. 5c that wiper 152 has extended entirely across the surface of filter 108 held within filter holder 106.

After the discharge position of carriage 70 and brew cavity 32 illustrated in solid lines in FIG. 5c, the carriage begins its return towards the brew position as indicated by the left hand directional arrow above the phantom portion of FIG. 5c. Guide pins 136 and 138 travel past narrowed middle portion 168 of pawl members 154 and 156 (see FIG. 6) until the upper surface of guide pins 136 and 138 contact the bottom surface of upper portion 170 of the pawl members (see FIG. 5c in phantom). The free end of each upper portion 170 of the pawl members is raised during the return portion of the operational cycle by the guide pins 136 and 138 as illustrated in phantom in FIG. 5c. During the return of the carriage to the brew position, wiper 152 again wipes the filter, as does the lower edge of brew cavity 32 until carriage 70 and brew cavity 32 have returned to the brew position illustrated in FIG. 5a.

Based on the foregoing description of the preferred embodiment, it should be appreciated that brew assembly 14 according to the present invention operates in a simple yet positive and consistent manner with a minimum of moving parts to efficiently and economically provide and dispense freshly brewed cups of tea or the like.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus for nonpressurized infusion brewing of a beverage including a brew assembly, the brew assembly comprising a frame;

a carriage reciprocable along the frame in a first direction between a brew position and a discharge position, the carriage including a slot formed therein generally transverse to the first direction;

a motor driving a rotating shaft;

a crank arm having two ends and being attached to the shaft proximate one end;

a crank pin attached to the crank arm proximate the other end of the crank arm and extending into the slot in the carriage;

the motor being actuatable to cause the carriage to reciprocate between the brew and discharge positions by rotating the shaft whereby the crank pin reciprocates within the slot;

a brew cavity mounted to the carriage and having side walls and an open top and bottom, the brew cavity having at least one guide pin mounted on a side wall;

a filter assembly mounted on the frame and aligned with the brew cavity at the brew position and including a filter for supporting solid infusible material;

brew cavity mounting means for mounting the brew cavity to the carriage such that the brew cavity is moveable vertically with respect to the carriage between upper and lower positions;

biasing means extending between the brew cavity and the carriage normally exerting a biasing force to bias the brew cavity toward the lower position to such an extent that when the brew cavity is in the brew position, the bottom of the brew cavity is held in sealing engagement with the filter assembly surrounding the filter;

cam means having a camming surface mounted on the frame between the brew and discharge positions for engagement with the brew cavity guide pin to overcome the biasing force and for raising the brew cavity from the lower position toward the upper position as the guide pin travels along the camming surface from the brew position toward the discharge position; and stop means associated with the brew cavity to prevent the brew cavity from extending below the lower position after the brew cavity guide pin travels past the cam means to the discharge position at which the brew cavity is abruptly biased to the lower position, whereby the infusible material from which the beverage has been brewed is dishcarged from the brew cavity.

2. Apparatus according to claim 1 further comprising motor control means including switch means activated by the crank arm.

3. Apparatus according to claim 2 further comprising a switch activating member attached to the crank arm proximate the second end.

4. Apparatus according to claim 3 wherein the switch activating member extends from a surface of the crank arm opposite the surface from which the crank pin extends.

5. Apparatus according to claim 1 wherein the frame includes side walls having top and bottom edges, the carriage being supported by the frame side walls, and wherein the carriage includes a top member and opposed side members attached to the top member and retaining means attached to the side members for retaining the carriage in a sliding relationship with respect to the frame.

6. Apparatus according to claim 5 wherein the retaining means comprises retaining elements attached to the side members of the carriage which extend below the bottom edges of the frame side walls, such that the retaining elements would abut the bottom edges when an upward vertical force is applied to the carriage.

7. Apparatus according to claim 5 wherein the brew cavity mounting means comprises side walls extending downwardly from the top member and spaced inwardly from the frame side walls, each of the mounting means side walls including a generally vertical elongated aperture into which extends a brew cavity guide pin protruding from opposite sides of the brew cavity.

8. Apparatus according to claim 7 wherein the stop means comprises a stop member attached to a side wall and proximate the top of the brew cavity, the brew cavity extending into an opening formed in the top member of the carriage, the stop member abutting the top member of the carriage when the brew cavity is in the lower position.

9. Apparatus according to claim 8 wherein the stop member is a flange extending around the periphery of the brew cavity and having at least one perimeter portion overlapping a perimeter portion of the opening in the top member of the carriage.

10. Apparatus according to claim 9 wherein the biasing means includes at least one extension spring having two ends, one end being attached to the brew cavity and the other end being attached to the carriage.

11. Apparatus according to claim 10 wherein the biasing means includes a plurality of the extension springs in which the one end of each spring is attached to the stop member flange at equidistant points around the stop member flange, and in which the other end of each spring is attached to lower portions of the brew cavity mounting means.

12. Apparatus according to claim 7 wherein the brew cavity includes generally vertical and outwardly extending flanges mounted on the opposite sides of the brew cavity, the guide pins being mounted on and extending outwardly from the generally vertical flanges.

13. Apparatus according to claim 12 wherein the brew cavity, the stop member flange, the generally vertical flanges and the guide pins are integrally formed as a unitary structure.

14. Apparatus according to claim 12 wherein the top member of the carriage includes holes through which the generally vertical flanges of the brew cavity extend.

15. Apparatus according to claim 1 wherein a wiping means is mounted on a lower portion of the carriage for wiping the solid infusible material off of the filter as the brew cavity travels from the brew position to the discharge position.

16. Apparatus according to claim 1 further comprising a housing in which the brew assembly is mounted;
a container mounted in the housing in which tea leaves are contained, the container including dispensing means for dispensing a predetermined amount of the tea leaves from the container into the brew cavity and onto the filter in the brew position;
a source of hot water mounted in the housing with a conduit having an outlet aligned with the brew cavity in the brew position;
means for dispensing a predetermined amount of hot water from the source through the conduit into the brew cavity in the brew position;
brewed beverage dispensing means including a conduit aligned with the filter for dispensing the brewed beverage into a cup supported by a support member attached to the apparatus in the housing.

17. A vending machine comprising the apparatus of claim 16.

18. A vending machine comprising the apparatus of claim 1.

* * * * *